Dec. 19, 1922.
D. MORIARTY.
TIRE RIM.
FILED AUG. 4, 1922.
1,439,256
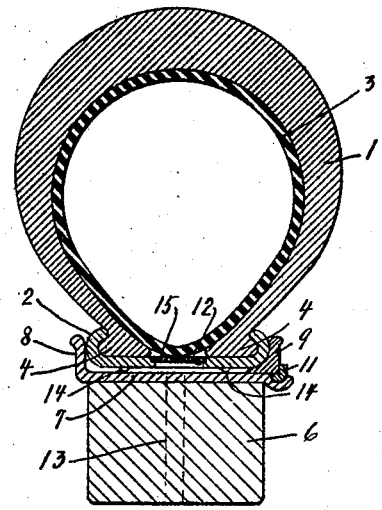
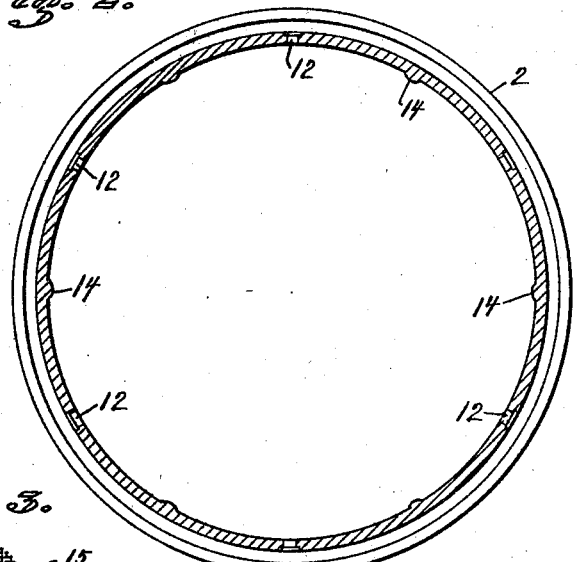
INVENTOR.
DANIEL MORIARTY
BY
ATTORNEYS.

Patented Dec. 19, 1922.

1,439,256

UNITED STATES PATENT OFFICE.

DANIEL MORIARTY, OF OAKLAND, CALIFORNIA.

TIRE RIM.

Application filed August 4, 1922. Serial No. 579,705.

*To all whom it may concern:*

Be it known that I, DANIEL MORIARTY, a citizen of the United States, and a resident of Oakland, county of Alameda, and State of California, have invented a new and useful Tire Rim, of which the following is a specification.

The present invention relates to improvements in tire rims and its particular object is to provide a rim which allows of ventilation of the inner tube whereby the latter is prevented from over-heating. This is of particular importance where metal portions are used in the construction of the tire but it is not desired to limit the present application to that specific construction. The invention is therefore illustrated in connection with an ordinary tire in common use.

The preferred form of the invention is shown in the accompanying drawing in which Figure 1 represents a cross section through the circumferential portion of a wheel having a pneumatic tire thereon, Figure 2 a longitudinal section through the tire rim and Figure 3 a plan view of a netting used in connection with my invention. While I have shown only the preferred form of the invention I wish to have it understood that various changes or modifications may be made within the scope of the claims hereto attached without departing from the spirit if the invention.

The tire (1) is shown in the drawing as being secured on the rim channel (2) with an inner tube (3) disposed inside of the tire. The rim selected for the purpose of this illustration may be of any suitable type, the arrangement being preferably such that the two beads (4) of the tire leave a space between them which allows the inner tube to come in direct contact with the rim as shown in the drawing. The rim may be secured to the felloe (6) in any suitable manner, as for instance, by the fixed ring (7) having a flange (8) on one side and a removable flange (9) at the other side adapted to be held in place by the locking ring (11).

The novel feature of my device consists in the perforation (12) in the rim channel. A plurality of these perforations may be provided, preferably in the central portion of the rim and their object is to allow air to enter and to come in contact with the inner tube. To prevent the inner tube from bulging outwardly through the perforations I provide a perforated cover (15) for the perforations, preferably made of wire netting.

If the rim lies flat against the felloe the latter should be perforated in a similar manner as shown at (13). If, however, the rim channel is provided with projections (14) as shown in the drawings which leave an air space between the rim and the felloe, the perforations (13) is not necessary.

The advantage of the perforations in the rim will be readily understood. They allow air to circulate around the tube which circulation increases as the speed of the vehicle increases and serves to keep the tire cool.

I claim:

1. In combination, a felly, a tire rim upon the felly having circumferentially spaced openings or perforations arranged centrally thereof, a pneumatic tire mounted upon the rim, a separate reticulated closure for each opening, and means for admitting air to the inner end of said openings whereby to provide ventilation for the pneumatic tire for the purpose described.

2. In combination, a felly, a perforated tire rim mounted upon the felly, a pneumatic tire carried by said rim, and means for holding the inner periphery of the rim in spaced relation with the outer periphery of the felly whereby to permit ventilation of the pneumatic tire for the purpose described.

3. In combination, a felly, a tire rim supported by the felly having circumferentially arranged perforations therein, said perforations occurring centrally of the rim, a pneumatic tire mounted upon said rim, and means upon the inner periphery of the rim adapted to hold the same in spaced relation with the outer periphery of the felly and thereby providing ventilation for the pneumatic tire for the purpose described.

DANIEL MORIARTY.